June 27, 1950

F. R. McFARLAND 2,513,192

MULTIPLE PISTON HYDRAULIC MOTOR
FOR PLANETARY GEAR BRAKES

Filed March 18, 1948

INVENTOR.
FOREST R. McFARLAND
BY

ATTORNEY.

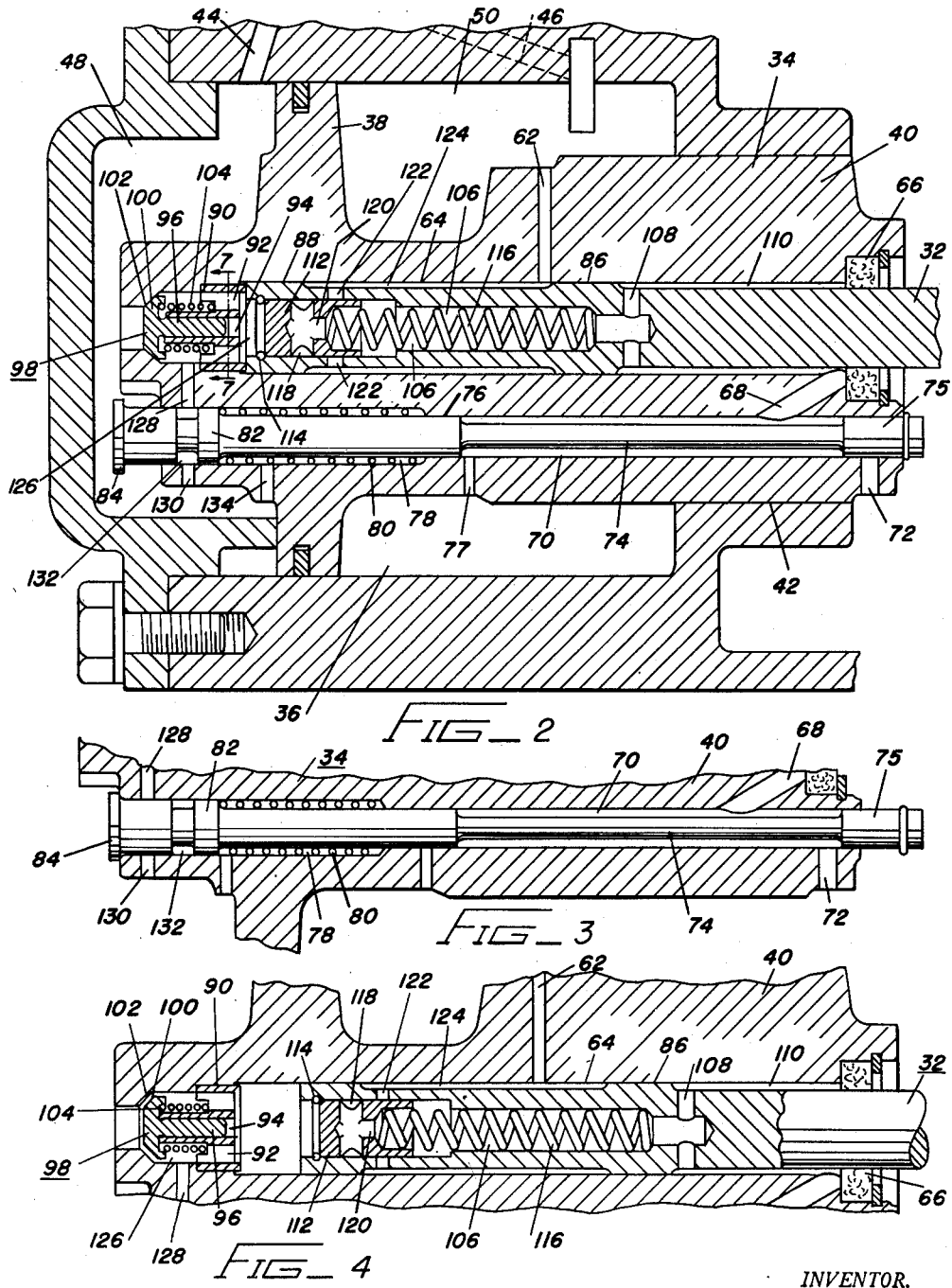

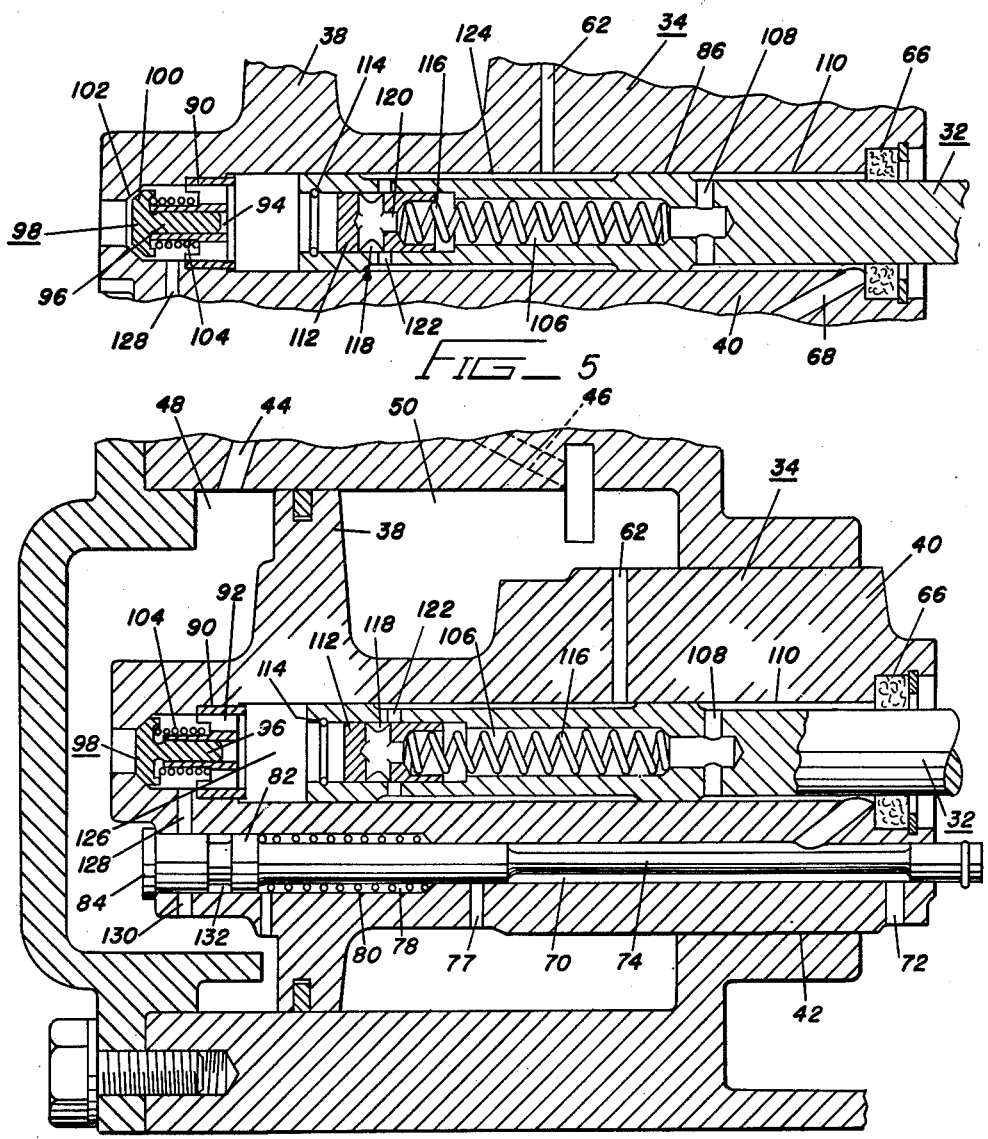
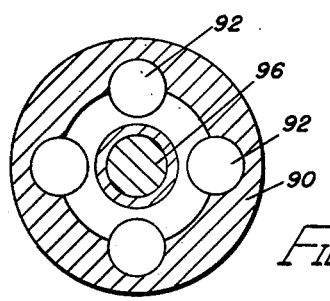

Patented June 27, 1950

2,513,192

UNITED STATES PATENT OFFICE 2,513,192

MULTIPLE PISTON HYDRAULIC MOTOR FOR PLANETARY GEAR BRAKES

Forest R. McFarland, Huntington Woods, Mich., assignor to Packard Motor Car Company, Detroit, Mich., a corporation of Michigan Application March 18, 1948, Serial No. 15,657

10 Claims. (Cl. 60—97)

This invention relates to transmission, and more particularly to improved means for engaging a planetary gear transmission brake by a fluid pressure actuated mechanism wherein a small diameter piston is actuated to take up clearance in the linkage, and a large diameter piston is thereafter actuated to set the brake.

In the operation of planetary gearing, it is desirable when making a fast start in a vehicle to lock the reaction member against rotation as rapidly as possible to permit rapidly accelerating torque to be transmitted to the driving wheels. In the operation of such devices fluid under pressure is supplied to engage the brake by a pump having a relatively low volumetric capacity. In setting the brakes it is necessary to first move the actuating mechanism to take up the clearance in the linkage and engage the brake band with the drum, and thereafter to engage the band with the drum with a sufficient force to lock the drum against rotation. The travel required to take up the slack in the linkage is considerably greater than the travel required to set the brakes after the slack has been taken up. I have found that desirable operating characteristics can be effected by providing a compound hydraulic actuating mechanism capable of operating in separate stages to first take up the slack in the linkage and apply the brake band to the drum, and thereafter to engage the band to the drum with a sufficient force to lock it against rotation.

An object of this invention is therefore to provide a planetary gear brake actuating mechanism of the hydraulic type wherein a small piston is first actuated to take up clearance in the linkage, and a large piston is thereafter actuated to set the brake.

Another object of this invention is to provide an improved planetary gear brake actuating mechanism wherein a large piston capable of exerting high brake applying pressure is restrained from operating until after a small piston has been actuated to take up clearance in the linkage and apply the brake band to the drum.

A further object of the invention resides in the provision of an improved hydraulic actuator wherein clearance in an actuating linkage is taken up by the displacement of a small quantity of fluid exerted over a small area, and high actuating pressures are thereafter exerted by the displacement of a small quantity of fluid exerted over a large area.

Still another object is to provide an improved hydraulic actuator wherein the force exerted on a piston by a quantity of fluid under pressure in an actuating chamber is opposed by the pressure of fluid trapped in a releasing chamber, and wherein movement of the piston in the actuating direction is controlled by metering fluid from the releasing chamber.

Yet a further object of the invention resides in the provision of a hydraulic actuator having successively operable elements wherein movement of the main force applying mechanism in the actuating direction is delayed until a secondary force applying mechanism has been actuated by relatively low fluid pressures to take up clearance, and to effect the release of trapped fluid restraining the main force applying mechanism.

Other objects of this invention will appear in the following description and appended claims, reference being had to the accompanying drawings forming a part of this specification and wherein like reference characters designate corresponding parts in the several views.

Fig. 2 is an enlarged fragmentary sectional view illustrating the compound hydraulic actuating mechanism in the released position.

Fig. 3 is a fragmentary sectional view of a portion of the device illustrated in Fig. 2, showing the vent controlling plunger in the actuated position.

Fig. 4 is a view similar to Fig. 3 showing the small piston in the partially actuated position.

Fig. 5 is a view similar to Fig. 4 showing the small piston in the position to take up clearance in the linkage and to vent the releasing chamber to permit the large piston to move in the actuating direction.

Fig. 6 is a view similar to Fig. 2 showing the device in the actuated position.

Fig. 7 is a sectional view taken substantially on the line 7—7 of Fig. 2 looking in the direction of the arrows.

Figure 1:
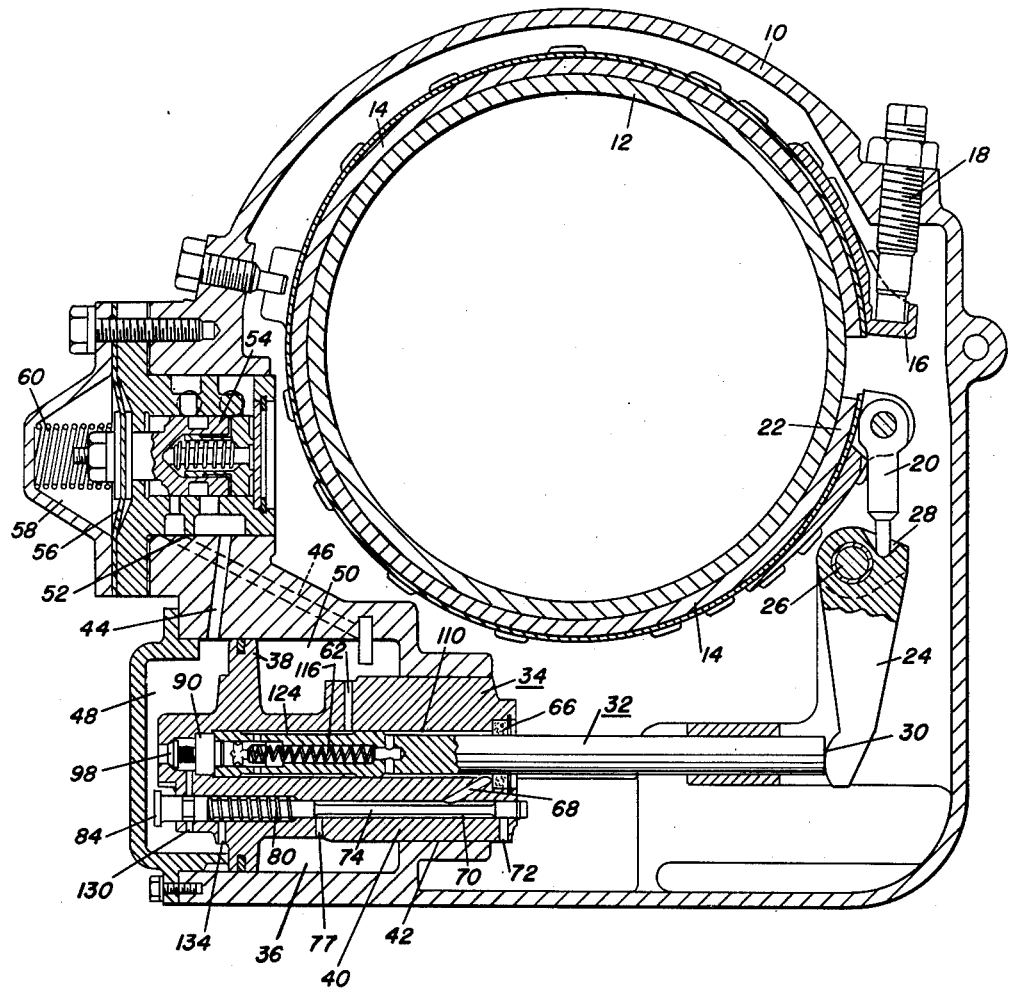
Fig. 1 is a sectional view of a device embodying this invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

This is a continuation in part of my copending application Ser. No. 690,517 filed August 14, 1946 disclosing a fluid unit for driving a planetary gear transmission wherein a brake is provided to restrain a reaction member to transmit torque through the planetary gear train. This invention is applicable to planetary gearing of all types including the sun and pinion type disclosed in said application Ser. No. 690,517, and to the internal gear type, and is also applicable to all types of hydraulic actuators wherein it is desirable to take up the slack in a linkage and thereafter exert an applying force. It may be applied to fluid driven units having two turbine members as disclosed in said application Ser. No. 690,517, or to fluid driven units having a single turbine member as disclosed in my copending applicacation Ser. No. 741,007 filed April 12, 1947 wherein planetary gearing is substituted for the gearing disclosed.

Referring now to Fig. 1 it will be noted that a casing 10 is adapted to receive a planetary gear unit of any desired type having a releasable member 12. The releasable member 12 may be a drum carried by one of the elements of the planetary unit to act as a fulcrum when restrained from rotation to transmit torque through the unit at a speed ratio other than one to one. A brake band 14 having one of its ends 16 anchored to the casing 10 as by an adjustable anchor pin 18 encircles the drum 12 and has a link 20 pivoted to its actuating end 22. The link 20 may be actuated by a lever 24 pivoted to the casing 10 as illustrated at 26, and having a cupped portion 28 to receive the free end of the link 20. The lever 24 is provided with a cammed surface 30 adapted to be engaged and actuated by the forward end of a small piston or rod 32. A high mechanical advantage linkage is thus provided for engaging the brake band 14 with the releasable member 12 to restrain it from rotating.

A compound piston is provided for actuating the brake. The rear end of the small piston 32 is slidably mounted in a large piston 34 mounted for reciprocating movement in a cylinder 36. The large piston 34 has a flange 38 engaging the walls of the cylinder 36, and a section 40 of somewhat smaller diameter than the flange 38 to engage a cylinder 42 of smaller diameter than the cylinder 36.

Means including fluid supply passages 44 and 46 are provided to supply fluid under pressure to actuating and releasing chambers 48 and 50 of the cylinder 36 on opposite sides of the flange 38 of the piston 34. The fluid supply passages 44 and 46 communicate with a cylinder 52 having a valve 54 controlling the flow of fluid under pressure to the actuating or releasing chambers 48 and 50. Fluid under pressure is delivered to the cylinder 52 by any suitable means such for example as a pump driven by any convenient portion of the transmission or by the engine.

Any suitable means may be provided to control the valve 54 to direct fluid under pressure to the actuating chamber 48 when the engine is operating to transmit torque to the transmission, and to direct fluid from the pump to the releasing chamber 50 when the engine is idling.

As illustrated in my aforementioned copending application Ser. No. 690,517 the valve 54 may be actuated by a diaphragm 56 subjected to reduced pressure in a diaphragm chamber 58 communicating with the intake manifold of the engine to move the valve 54 against the resistance of a spring 60 when the engine is idling. When torque is supplied by the engine operating above its idling speed, the chamber 58 is vented, and the connection between the chamber 58 and the intake manifold of the engine is interrupted whereupon the spring 60 moves the valve 54 to direct fluid under pressure to the actuating chamber 48.

Referring now more particularly to Fig. 2 it will be noted that the section 40 of the large piston 34 is provided with a vent passage 62 interconnecting the releasing chamber 50 with a bore 64 which extends through the large piston 34 and receives the piston 32. The front end of the bore 64 through which the piston 32 passes is provided with a seal 66 to prevent the escape of fluid around the piston 32. An angularly disposed passage 68 extending from the front end of the bore 64 adjacent the seal 66 communicates with an axially extending passage 70 spaced from and extending parallel with the bore 64 through the piston 34. The passage 70 communicates with a radial vent passage 72 positioned in the large piston 34 beyond the front end of the smaller diameter cylinder 42 when the large piston 34 is in its rearmost position illustrated in Figs. 1 and 2.

The axially extending passage 70 is controlled by an axially movable rod 74 having enlarged sections 75 and 76 to close the vent passage 72 when the rod 74 is in its rearmost position, and to close a passage 77 interconnecting the releasing chamber 50 and the passage 70 when the rod 74 is shifted forwardly. The rearward end of the passage 70 is enlarged as illustrated at 78 to receive a spring 80 bearing against a flange 82 carried by the rod 74 to move the rod 74 rearwardly to the non-venting position. A flange 84 positioned at the rear end of the rod 74 is provided to prevent forward movement of the rod beyond the position illustrated in Fig. 3. The piston 32 is somewhat smaller than the diameter of the bore 64 in the large piston 34 and is provided with spaced sections 86 and 88 of larger diameter to guide the piston 32 in the larger piston 34.

The rearward end of the bore 64 in the large piston 34 is provided with a fitting 90, see also Fig. 7, having a plurality of spaced apertures 92 and a central opening 94 providing a guide for the stem 96 of a valve member 98. The valve member 98 is subjected to fluid pressure in the actuating chamber 48, and is provided with a conical shaped head 100 adapted to be yieldingly urged towards a seat 102 by a spring 104 interposed between the fitting 90 and the head of the valve 98.

The rear end of the piston 32 is provided with a central bore 106 terminating at its forward end in radially extended ports 108 communicating with an annular chamber 110 between the section 86 of larger diameter of the piston 32 and the seal 66. The rearward end of the bore 106 in the piston 32 is closed by a plunger 112 slidably mounted therein and retained in place by a snap ring 114, a spring 116 being interposed between the plunger and the forward end of the bore 106 to urge the plunger rearwardly into abutting relation with the snap ring 114. The plunger 112 is provided with radially extended ports 118 communicating with the central bore 106 of the piston 32 through a central port 120 in the plunger 112. The radial ports 118 are adapted to align with circumferentially spaced ports 122 positioned near the rear end of the piston 32 when the plunger 112 is moved axially a predetermined distance against the resistance of the spring 116 in the bore 106 by fluid pressure from the actuating chamber 48. The ports 122 communicate with the releasing chamber 50 through the vent passage 62 and an annular chamber 124 between the bore 64 and the axially spaced sections 86 and 88 of enlarged diameter of the piston 32.

The chamber 126 between the plunger 112 in the rear end of the piston 32 and the valve 98 in the bore 64 of the large piston 34 may be vented to the actuating chamber 48 when the valve 98 is in the closed position by spaced vent passages 128 and 130 in the large piston 34 and a circumferential groove 132 in the rear end of the axially movable rod 74 when it is in the rearmost position illustrated in Figs. 1 and 2. A vent passage 134 in the large piston 34 is provided to vent the chamber 78 which houses the spring 80 to move the rod 74 rearwardly to the position illustrated in Figs. 1 and 2.

The operation is as follows: When the engine is idling at which time no power is transmitted to the planetary gearing, the diaphragm chamber 58 is subjected to the reduced pressure in the intake manifold whereupon the diaphragm 56 is moved rearwardly against the resistance of the spring 60 to move the valve 54 in the cylinder 52 to direct fluid under pressure from the pump to the fluid supply passage 46 leading to the releasing chamber 50 to disengage the brake band 14 from the releasable member 12 and maintain it in the disengaged position.

When the engine is speeded up to direct torque through the planetary gearing, the diaphragm chamber 58 is vented whereupon the pressure increases and the spring 60 moves the diaphragm 56 forwardly to the position illustrated in Fig. 1 thereby moving the valve 54 in the cylinder 52 to direct fluid from the fluid pressure supply means to the passage 44 communicating with the actuating chamber 48, and interrupting the supply of fluid under pressure through the passage 46 to the releasing chamber 50.

As pressure builds up in the actuating chamber 48 the rod 74 controlling the vent passage 72 is moved forwardly by fluid pressure exerted in the chamber 48 on the exposed end of the rod 74 against the resistance of the spring 80 to the position illustrated in Fig. 3 thereby shifting the enlarged section 75 forwardly to open the vent passage 72.

The fluid in the releasing chamber 50 is trapped therein because the section 86 of larger diameter of the piston 32 prevents fluid from the vent passage 62 from flowing to the annular chamber 110 connected with the vent passage 72 through the passages 68 and 70. The plunger 112 is maintained in its rearmost position in the piston 32 by the spring 116 and prevents fluid from flowing through the ports 122, central bore 106 and ports 108 to the annular chamber 110. The large piston 34 is thus restrained from moving forwardly in the brake applying direction.

As fluid pressure continues to build up in the actuating chamber 48 the valve 98 is actuated thereby compressing the spring 104 and admitting fluid under pressure to the chamber 126 from the actuating chamber 48 to urge the piston 32 and plunger 112 forwardly. Since forward movement of the plunger 112 is resisted by the spring 116 the piston 32 is moved forwardly as pressure builds up in the actuating chamber 48 and in chamber 126 to move the lever 24 about its pivot 26 to take up the slack in the linkage and engage the brake band 14 with the releasable member 12 as illustrated in Fig. 4.

When the slack in the linkage has been taken up, forward movement of the piston 32 is arrested due to the engagement of the band 14 with the member 12. The pressure exerted on the plunger 112 moves it forwardly in the bore 106 of the piston 32 thereby compressing the spring 116. When the plunger 112 moves sufficiently to align its ports 118 with the ports 122 in the piston 32 as illustrated in Fig. 5, fluid flows from the releasing chamber 50, through the vent passage 62, annular chamber 124, ports 122 and 118, bore 106, ports 108, annular chamber 110, passages 68 and 70 to the vent 72 where it is discharged to the sump.

As fluid escapes from the releasing chamber 50 the pressure exerted in the actuating chamber 48 moves the large piston 34 forwardly. As soon as the large piston 34 moves, the pressure in the chamber 126 between the valve 98 and the small piston 32 increases. The valve 98 immediately closes to trap a quantity of oil between the valve 98 and the small piston 32 because the vent passage 128 is closed by the forward end of the rod 74 as illustrated in Figs. 3 and 6. The pressure exerted on the large piston 34 in the actuating chamber 48 is thus transmitted through a column of oil in the chamber 126 to move the small piston 32 forwardly to securely clamp the brake band 14 with the releasable member 12 as illustrated in Fig. 6 to restrain the releasable member. If fluid bleeds out of the chamber 126, the large piston 34 moves forwardly to maintain the brake applying pressure on the small piston 32, and the fitting 90 finally abuts the rear end of the piston 32 whereupon the force exerted on the large piston 34 is exerted directly on the piston 32 to maintain brake engagement.

An applying mechanism for a planetary gear brake is thus provided whereby the small piston of a compound piston mechanism is first actuated to take up the slack in the linkage, and a large piston is thereafter actuated to set the brake. Minimum displacement of fluid is thus required, and the brake may be applied more rapidly than where a larger volume of fluid must be displaced to effect brake engagement.

When the accelerator controlling the power delivered by the engine is released, the diaphragm chamber 58 is subjected to the reduced pressure in the intake manifold. The diaphragm 56 then shifts rearwardly against the resistance of the spring 60 to move the valve 54 to connect the fluid pressure supply means through the passage 46 with the releasing chamber 50 and venting the actuating chamber 48 through the valve 54.

As the pressure decreases in the actuating chamber 48 the spring 80 shifts the rod 74 rearwardly to position the enlarged section 75 at the front end of the rod to close the vent passage 72 thereby preventing the further escape of fluid from the releasing chamber 50, and shifting its enlarged section 76 to uncover the passage 77. The spring 104 maintains the valve 98 in the closed position to interrupt the flow of fluid to the chamber 126 and the chamber 126 is vented to the actuating chamber 48 through the vent passages 128 and 130 and the circumferential groove 132 adjacent the rear end of the rod 74. The spring 116 in the bore 106 of the small piston 32 shifts the plunger 112 rearwardly to interrupt communication between the passages 118 and 122 thereby closing communication between the annular chamber 110 and the releasing chamber 50. As pressure builds up in the releasing chamber 50, the large piston 34 is shifted rearwardly due to the force exerted on the flange 38 of the large piston 34 to disengage the brake band 14 from the releasable member 12.

Fluid under pressure flows from the releasing chamber 50 through the passages 77, 70 and 68 and is exerted in the annular chamber 110 between the seal 66 and the section of larger diameter 86 of the piston 32 to shift the piston 32 rearwardly to release the slack in the brake applying linkage.

It will be understood that various forms of the invention other than that described above may be used without departing from the spirit or scope of the invention.

I claim:

1. A fluid pressure operated device to actuate a lever comprising a cylinder, a compound piston including a large diameter piston slidably mounted in the cylinder and having actuating and releasing chambers on opposite sides thereof, a small diameter piston slidably mounted in the large piston, connecting means between the small piston and the lever to be actuated, means to selectively admit fluid under pressure to the actuating chamber and to the releasing chamber, the large and small diameter pistons having cooperating vent passage forming means adapted to align when the small piston is in a predetermined actuated position relative to the large piston to vent the releasing chamber, the combination therewith of a plunger in the large piston adapted in one position to interrupt venting of the releasing chamber and adapted when subjected to substantially predetermined pressure in the actuating chamber to shift its position in the large piston to permit venting of the releasing member, the small piston moving to exert force on the lever to be actuated upon the attainment of a substantially predetermined pressure in the actuating chamber, fluid pressure operated means associated with the small piston and operable upon the attainment of a substantially predetermined pressure in the actuating chamber to align the venting means between the large and small pistons to reduce the pressure of fluid in the releasing chamber to permit the large piston to move in the cylinder in response to pressure in the actuating chamber to exert increased force on the lever to be actuated.

2. In a fluid pressure device for actuating a linkage, a cylinder, a piston slidably mounted in the cylinder and having actuating and releasing chambers on opposite sides thereof, a small piston slidably mounted in the first mentioned piston, connecting means between the small piston and said linkage, means to selectively admit fluid under pressure to the actuating chamber or the releasing chamber, said pistons having cooperating vent passage forming means adapted to align when the pistons are moved to a predetermined position relative to each other to vent the releasing chamber, the combination therewith of a plunger in the first mentioned piston adapted in one position to interrupt venting of the releasing chamber and adapted when subjected to substantially predetermined pressure in the actuating chamber to shift its position in the first mentioned piston to permit venting of the releasing chamber, the small piston moving to engage the linkage upon the attainment of a substantially predetermined pressure in the actuating chamber and thereafter to align the venting means between the first mentioned piston and the small piston to reduce the pressure of fluid in the releasing chamber to permit the first mentioned piston to move in said cylinder in response to pressure in the actuating chamber to actuate said linkage.

3. A hydraulic actuator for a planetary gear brake having an actuating linkage comprising a cylinder, a large piston slidably mounted in the cylinder, spaced fluid supply means to selectively admit fluid under pressure to actuating and releasing chambers of the cylinder on opposite sides of the piston, a small piston operably connected to said actuating linkage and slidably mounted in the large piston, means operable upon the attainment of substantially predetermined fluid pressure in the actuating chamber to move the small piston to take up slack in the actuating linkage, and means operable upon the attainment of a higher substantially predetermined fluid pressure in the actuating chamber to vent the releasing chamber and move the large piston in the brake applying direction in response to pressure in the actuating chamber, movement of the large piston in the brake applying direction being controlled by the rate of venting of fluid from the releasing chamber.

4. In a fluid pressure operated device to actuate a lever, a cylinder, a compound piston including a large piston slidably mounted in the cylinder and having actuating and releasing chambers on opposite sides thereof, a small piston slidably mounted in the large piston, connecting means between the small piston and the lever to be actuated, means to selectively admit fluid under pressure to the actuating and the releasing chambers, the large and small pistons having vent passage forming means adapted to align when the small piston is in a predetermined actuated position relative to the large piston to vent the releasing chamber, a plunger in the large piston adapted in one position to interrupt venting of the releasing chamber and adapted when subjected to substantially predetermined pressure in the actuating chamber to shift its position in the large piston to permit venting of the releasing chamber, yielding means urging the plunger toward the vent interrupting position, the small piston moving to exert force on the lever to be actuated upon the attainment of a predetermined pressure in the actuating chamber and thereafter to align the venting means between the large and small pistons to permit the escape of fluid under pressure from the releasing chamber to permit the large piston to move in the cylinder in response to increased pressure in the actuating chamber to exert increased force on the lever to be actuated.

5. A fluid pressure mechanism to actuate a lever comprising a cylinder, a large piston slidably mounted in the cylinder, spaced fluid supply means to admit fluid under pressure to actuating and releasing chambers of the cylinder on opposite sides of the piston, a small piston operably connected to said lever and slidably mounted in the large piston, means to trap fluid in the releasing chamber to restrain movement of the large piston in the actuating direction, means operable upon the attainment of substantially predetermined fluid pressure in the actuating chamber to move the small piston to exert force on the lever, means operable upon the attainment of higher substantially predetermined fluid pressure in the actuating chamber after the small piston has moved to exert force on the lever to permit the escape of fluid from the releasing chamber to permit movement of the large piston in the lever actuating direction, and means operable by movement of the large piston in the lever actuating direction to trap fluid between portions of the large and small pistons whereby high lever actuating pressures may be exerted by small movement of the large piston.

6. A fluid pressure operated mechanism to actuate a linkage comprising a cylinder, a piston slidably mounted in the cylinder and having actuating and releasing chambers on opposite sides thereof, a small piston slidably mounted in the first mentioned piston and operably connected to said linkage, means to selectively direct fluid under pressure to the actuating chamber or to the releasing chamber, a vent passage in the first mentioned piston, a fluid pressure actuated plunger in the first mentioned piston adapted when subjected to predetermined fluid pressure in the actuating chamber to move axially therein to open said vent passage, fluid pressure actuated means carried by the first mentioned piston to subject the small piston to fluid pressure in the actuating chamber upon the attainment of a substantially predetermined pressure therein to move the small piston to exert force on the linkage, a plunger slidably mounted in the small piston and adapted when subjected to a substantially predetermined fluid pressure from the actuating chamber to shift axially relative to the small piston to render operable venting means interposed between the first mentioned piston and the small piston to vent the releasing chamber thereby permitting the first mentioned piston to move in the linkage actuating direction, and means operable by initial movement of the first mentioned piston in the linkage actuating direction to trap a column of fluid between the first mentioned piston and the plunger slidably mounted relative to the small piston whereby movement of the first mentioned piston in the linkage actuating direction in response to fluid pressure in the actuating chamber is transmitted to the small piston through said column of fluid to exert increased force on the linkage.

7. A hydraulic actuator for a planetary gear brake having an actuating linkage comprising a cylinder, a large piston slidably mounted in the cylinder, spaced fluid supply means to admit fluid under pressure to actuating and releasing chambers of the cylinder on opposite sides of the piston, a small piston operably connected to said actuating linkage and slidably mounted in the large piston, means to trap fluid in the releasing chamber, means operable upon the attainment of a substantially predetermined fluid pressure in the actuating chamber to move the small piston to take up slack in the actuating linkage, means operable upon the attainment of a higher substantially predetermined fluid pressure in the actuating chamber to permit the escape of fluid from the releasing chamber to permit the pressure fluid to move the large piston in the brake applying direction to engage the brake.

8. A fluid pressure operated device to actuate a linkage comprising a cylinder, a compound piston including a large piston slidably mounted in the cylinder and having actuating and releasing chambers on opposite sides thereof, a small piston slidably mounted in the large piston, connecting means between the small piston and the linkage to be actuated, means to selectively admit fluid under pressure to the actuating chamber or to the releasing chamber, the combination therewith of a fluid pressure actuated plunger in the large piston adapted when subjected to predetermined fluid pressure in the actuating chamber to move axially therein to permit venting of the releasing chamber, the small piston moving to exert force on the linkage upon the attainment of a substantially predetermined pressure in the actuating chamber, a plunger slidably mounted relative to the small piston and adapted when the actuating chamber is subjected to a substantially predetermined pressure to shift axially in the small piston to align the venting means between the large and small pistons to vent the releasing chamber to permit movement of the large piston in the linkage actuating direction, and means actuated by the initial movement of the large piston in the linkage actuating direction to trap a column of fluid between the large piston and the plunger slidably mounted relative to the small piston whereby movement of the large piston in the linkage actuating direction is transmitted to the small piston through said column of fluid to exert increased force on the linkage to be actuated.

9. A fluid pressure device to actuate a lever comprising a cylinder, a small piston operably connected to said lever, a large piston interposed between the small piston and the cylinder, fluid pressure actuated means to move the small piston to exert force on the lever, fluid pressure means to restrain the large piston from movement in the lever actuating direction until the small piston has been actuated to exert force on the lever, and fluid pressure means operable upon the exertion of substantially predetermined force by the small piston on the lever to release the fluid pressure means restraining movement of the large piston in the lever actuating direction to permit the large piston to exert increased force on the lever.

10. In a fluid pressure device for actuating a linkage, a cylinder, a piston slidably mounted in the cylinder, means to selectively admit fluid under pressure to actuating and releasing chambers at opposite ends of the cylinder, a small piston slidably mounted in the first mentioned piston, connecting means between the small piston and the linkage to be actuated, interconnected vent passages in the first mentioned piston and the small piston to vent the releasing chamber, means associated with the first mentioned piston to interrupt venting of the releasing chamber when the actuating chamber is not subjected to fluid pressure, means operable upon the attainment of substantially predetermined pressure in the actuating chamber to move the small piston to take up slack in the linkage, and means operable upon the attainment of higher pressure in the actuating chamber to thereafter render said venting means operable to vent the releasing chamber and trap a column of fluid between the first mentioned piston and the small piston whereby pressure exerted on the first mentioned piston in the actuating chamber may be transmitted through said column of fluid to actuate said linkage.

FOREST R. McFARLAND.

REFERENCES CITED

The following references are of record in the file of this patent:

UNITED STATES PATENTS

| Number | Name | Date |
| --- | --- | --- |
| 1,210,846 | Royce | Jan. 2, 1917 |
| 1,690,968 | Cole | Nov. 6, 1928 |
| 2,001,971 | McConkey | May 21, 1935 |
| 2,193,305 | Thompson | Mar. 12, 1940 |
| 2,227,245 | Carroll | Dec. 31, 1940 |
| 2,282,556 | Bowen | May 12, 1942 |
| 2,453,785 | Cousino | Nov. 16, 1948 |

FOREIGN PATENTS

| Number | Country | Date |
| --- | --- | --- |
| 27,982 | Switzerland | Apr. 29, 1903 |
| 521,980 | Great Britain | June 5, 1940 |